Jan. 4, 1955   P. W. JOHNSON   2,698,485
DIAL INDICATOR BRACKET AND DIAL BRACKET COMBINATION
Filed Feb. 14, 1950
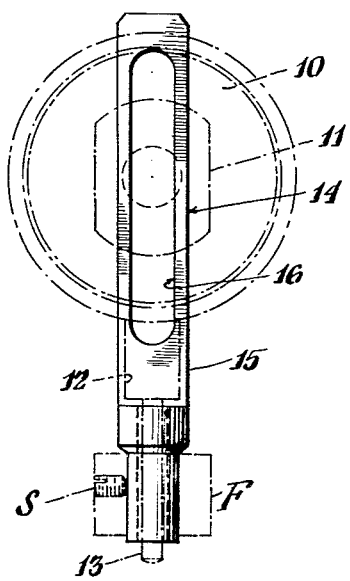
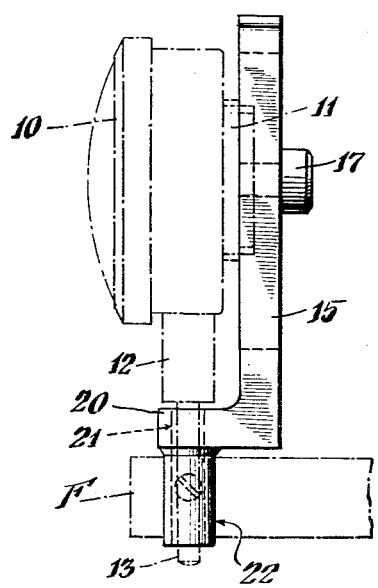
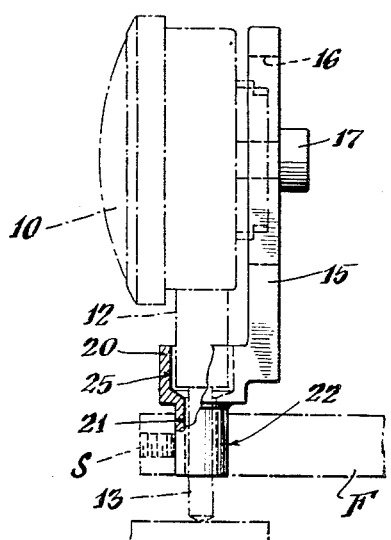
INVENTOR.
Paul W. Johnson
BY
ATTORNEY

United States Patent Office 2,698,485
Patented Jan. 4, 1955

2,698,485
DIAL INDICATOR BRACKET AND DIAL BRACKET COMBINATION

Paul W. Johnson, Bloomfield, Conn., assignor, by mesne assignments, to The Johnson Gage Development Company, a corporation of Connecticut Application February 14, 1950, Serial No. 144,141

6 Claims. (Cl. 33—172)

The invention relates to a bracket for use with a dial indicator whereby the indicator is secured in mounted gaging position by its back plate and in which the bracket and indicator is rotatably adjustable so that it may be observed from any position. The invention also relates to the combination of bracket and dial indicator. Dial indicators should not be secured in place upon the stem thereof because the securing screw often times distorts the stem and binds the indicator pointer so that the accuracy of the indicator is affected. Also if the gaging instrument should be dropped or struck, the stem of the indicator is quite likely to receive a permanent bend which affects the accuracy of the indicator. The stem of the indicator, however, is a very convenient means for mounting the indicator in position and for this reason is commonly used for this purpose.

It is an object of the invention to construct a bracket for a dial indicator which secures the same in place by attachment to the back plate of the dial indicator and yet permits adjustable rotation of the indicator for reading in any direction and in addition the bracket is mountable in any hole in a frame which heretofore was constructed to receive the stem of the dial indicator.

Another object is to construct a bracket as above in which the bracket is adjustable upon the backing plate of the dial indicator.

Other objects of the invention will be more apparent from the following description when taken in connection with the accompanying drawings in which:

Figure 1 is a rear elevation of a dial indicator and of the bracket secured to the back thereof;

Figure 2 is a side elevation of the bracket and dial indicator; and

Figure 3 is a side elevation of a modified form of bracket.

A dial indicator has a case 10 upon which a suitable backing 11 is provided. The dial indicator or case thereof carries a stem 12 through which the operating point 13 extends and connects with the interior mechanism of the indicator. It is the stem 12 which is commonly used to mount the dial indicator in gaging position.

The bracket includes a bar 15 which is adapted to be secured to the back plate 11 of the dial indicator. The bar 15 has an opening 16 therethrough through which a securing or fastening means such as a screw or bolt 17 passes and is threaded into the back plate of the dial indicator. The opening 16 is preferably an elongated slot so that the bracket may be adjusted with respect to the indicator and the back plate thereof. The bracket may be received in a channel 14 in the back plate 11 which permits adjustment of the bracket with respect to the back plate in the direction of the stem.

The bracket or bar 15 thereof has an offset portion 20 which has a hole 21 therethrough through which the operating point 13 of the dial indicator passes. The hole 21 has ample clearance for the operating point so that it cannot be bound therein. The offset portion has a cylindrical surface 22 which is adapted to be received in a hole in a frame F for supporting the bracket and hence the dial indicator in position for gaging purposes and hence the offset portion constitutes a bracket stem. The frame may carry a screw S for gripping the bracket in place. The cylindrical surface 22 is parallel with the bracket bar and has a diameter the same as that of the stem 12 of the dial indicator so that the bracket may be used in all places or mountings heretofore adapted to receive the stem 12 of the dial indicator and mount it in position without change of the frame or indicator and with the ability to be turned to any position desired for direct view of the dial.

It may be desirable to use an indicator with a shorter point 13 in which case the offset portion 20 may have a larger hole 25 extending therethrough to receive the stem 12 of the indicator. In all other respects the bracket of Figure 3 is like that of Figures 1 and 2.

This invention is presented to fill a need for improvements in a dial indicator bracket. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A bracket for rotatably holding a dial indicator having a stem projecting radially from the indicator and operating point comprising a bar having an opening therethrough to receive a screw or bolt for attachment solely to the back of a dial indicator, an offset portion carried by the bar at one end thereof and having a part thereof extending parallel with the bar, the offset portion having a hole therethrough larger than the indicator point and the offset portion being adjacent to the opening in the bar so that the indicator point may pass therethrough, and an external cylindrical surface upon the offset portion extending parallel with the bar having a diameter the same as to that of the stem of the dial indicator and adapted to be rotatably received in a hole of stem diameter carried by a frame upon which the bracket and indicator are mounted and to leave the dial indicator stem free of contact and distorting pressures.

2. A bracket as in claim 1 in which the offset portion hole is of a diameter to pass the indicator point only therethrough.

3. A bracket as in claim 1 in which the offset portion has a hole countersunk thereinto larger than the stem of the dial indicator to freely receive the stem.

4. A bracket and dial indicator combination comprising a dial indicator having a stem projecting radially from the indicator, and operating point, a bracket including a bar having an opening therethrough to receive a fastening means for attaching the bar to the back of the dial indicator and providing the sole attachment, an offset portion carried by the bar at one end thereof and having a part thereof extending parallel with the bar, the offset portion having a hole therethrough larger than the indicator point and the offset portion being adjacent to the opening in the bar so that the indicator point of the dial indicator may pass therethrough, and an external cylindrical surface upon the offset portion extending parallel with the bar having a diameter the same as that of the stem of the dial indicator and adapted to be rotatably received in a hole of stem diameter in a frame upon which the bracket and indicator are mounted and to leave the dial indicator stem free of contact and distorting pressures.

5. A bracket as in claim 4 in which the offset portion hole is of a diameter to pass the indicator point only therethrough.

6. A bracket as in claim 4 in which the offset portion has a hole countersunk thereinto larger than the stem of the dial indicator to freely receive the stem.

References Cited in the file of this patent

UNITED STATES PATENTS

| Number | Name | Date |
|---|---|---|
| 235,828 | Thatcher | Dec. 21, 1880 |
| 426,341 | Strong | Apr. 22, 1890 |
| 617,096 | Harrison et al. | Jan. 3, 1899 |
| 931,437 | Larson | Aug. 17, 1909 |
| 1,504,680 | Fernandez | Aug. 12, 1924 |
| 1,664,583 | Wheelock | Apr. 3, 1928 |
| 1,891,365 | Albertson | Dec. 20, 1932 |
| 2,052,153 | Willis | Aug. 25, 1936 |
| 2,105,502 | Painter | Jan. 18, 1938 |
| 2,184,583 | Danko | Dec. 26, 1939 |
| 2,357,024 | Robins | Aug. 29, 1944 |
| 2,454,246 | Warthen | Feb. 10, 1948 |
| 2,445,875 | Emery | July 27, 1948 |
| 2,551,242 | Burwinkle | May 1, 1951 |